(12) United States Patent
Wu et al.

(10) Patent No.: US 12,335,107 B2
(45) Date of Patent: Jun. 17, 2025

(54) METHOD OF LOAD FORECASTING VIA ATTENTIVE KNOWLEDGE TRANSFER, AND AN APPARATUS FOR THE SAME

(71) Applicant: SAMSUNG ELECTRONICS CO., LTD., Suwon-si (KR)

(72) Inventors: Di Wu, Saint-Laurent (CA); Michael Jenkin, Toronto (CA); Yi Tian Xu, Montreal (CA); Xue Liu, Montreal (CA); Xi Chen, Montreal (CA); Gregory Lewis Dudek, Westmount (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 370 days.

(21) Appl. No.: 17/874,925

(22) Filed: Jul. 27, 2022

(65) Prior Publication Data
US 2023/0055079 A1 Feb. 23, 2023

Related U.S. Application Data

(60) Provisional application No. 63/227,958, filed on Jul. 30, 2021.

(51) Int. Cl.
*H04L 41/00* (2022.01)
*H04L 41/147* (2022.01)
*H04L 41/16* (2022.01)

(52) U.S. Cl.
CPC ............ *H04L 41/147* (2013.01); *H04L 41/16* (2013.01)

(58) Field of Classification Search
CPC ..... H04L 41/147; H04L 41/16; H04L 47/824; H04L 47/83; H04L 47/822; H04W 28/08;
(Continued)

(56) References Cited

U.S. PATENT DOCUMENTS 9,585,038 B2  2/2017  Al-Shalash et al.
10,652,318 B2  5/2020  Rodriguez
(Continued)

FOREIGN PATENT DOCUMENTS

CN  111680818 A  9/2020
CN  112054943 A  12/2020
(Continued)

OTHER PUBLICATIONS

International Search Report (PCT/ISA/210) dated Nov. 10, 2022 issued by the International Searching Authority in application No. PCT/KR2022/011309.

*Primary Examiner* — Mounir Moutaouakil
(74) *Attorney, Agent, or Firm* — Sughrue Mion, PLLC

(57) ABSTRACT

A method of forecasting a future load may include: obtaining source data sets and a target data set that have been collected from a plurality of source base stations and a target base station, respectively; among a plurality of source machine learning models, selecting at least one machine learn source model that has a traffic load prediction performance higher than that of a target machine learning model through a negative transfer analysis; obtaining model weights to be applied to the target machine learning model and the selected at least one source machine learning model via an attention neural network that is jointly trained with the target machine learning model and the selected source machine learning models; obtaining a load forecasting model for the target base station by combining the target machine learning model and the selected at least one source machine learning model according to the model weights; and predicting a future communication traffic load of the target base station based on the load forecasting model.

20 Claims, 11 Drawing Sheets

(58) Field of Classification Search
CPC .... G06N 3/0442; G06N 3/045; G06N 3/0499; G06N 3/096
See application file for complete search history.

(56) References Cited

U.S. PATENT DOCUMENTS

| | | | |
|---|---|---|---|
| 2017/0026888 A1 | 1/2017 | Kwan | |
| 2019/0141543 A1* | 5/2019 | Ganapathi | H04W 24/08 |
| 2020/0252300 A1* | 8/2020 | Levy-Abegnoli | H04L 41/0895 |
| 2020/0389404 A1 | 12/2020 | Wu et al. | |
| 2021/0133585 A1 | 5/2021 | Lee et al. | |
| 2022/0207357 A1* | 6/2022 | Wu | G06N 3/044 |
| 2022/0286364 A1* | 9/2022 | Ashok | H04L 41/147 |
| 2023/0007564 A1* | 1/2023 | Balasubramanian | H04L 25/0254 |
| 2024/0147295 A1* | 5/2024 | Lindberg | H04W 28/0263 |

FOREIGN PATENT DOCUMENTS

| | | |
|---|---|---|
| CN | 112752290 A | 5/2021 |
| CN | 112954707 A | 6/2021 |
| WO | 2018103524 A1 | 6/2018 |

* cited by examiner

| Type of Features | Available Features for Base Station of Carrier 1 | Available Features for Base Station of Carrier 2 |
|---|---|---|
| # of Active UEs | Active UEs per second | Active UEs per minute |
| IP Throughput | IP Throughput per second | IP Throughput per minute |
| UE Behavior | UE Behavior | None |

METHOD OF LOAD FORECASTING VIA ATTENTIVE KNOWLEDGE TRANSFER, AND AN APPARATUS FOR THE SAME

CROSS-REFERENCE TO RELATED APPLICATION(S)

This application is based on and claims priority under 35 U.S.C. § 119 to U.S. Provisional Patent Application No. 63/227,958, filed on Jul. 30, 2021, in the U.S. Patent & Trademark Office, the disclosure of which is incorporated by reference herein in its entirety.

BACKGROUND

1. Field

The disclosure relates to a method of load forecasting, and an apparatus for the same, and more particularly to a method of short-term load forecasting via attentive knowledge transfer, and an apparatus for the same.

2. Description of Related Art

For many real-world applications for load forecasting, it is difficult to collect enough training data for a particular domain of interest, which is referred to as a target domain. Meanwhile, a large amount of training data may be available on some related domains, which are referred to as source domains. Transfer learning aims to improve the learning performance in the target domain by utilizing knowledge from both the target domain and the source domains. Transfer learning has shown to be an effective approach for several real-world applications including communication traffic patterns, image classification, energy management, and indoor WiFi localization.

Communication traffic forecasting is essential for the performance of a mobile communication system, such as a 5th-generation or a 6th-generation mobile communication system. Depending on the forecasting horizon, load forecasting ranges from short-term (hours or minutes ahead) to long-term (years ahead). Short-Term Load Forecasting (STLF) is mainly used to assist real-time communication traffic forecasting, connection density forecasting, peak data rate forecasting, system key performance indicators (KIPs) forecasting, and user behavior forecasting while long-term load forecasting is mainly applied for communication infrastructure planning. Accurate short-term load forecasting can facilitate efficient resource allocation and traffic distribution between base stations. In the real world, since communication traffic patterns dynamically change in real time and each base station has limited resources, it is of critical importance to deploy resources as close to the actual demand as possible to maintain the system performance and also to avoid waste of resources.

SUMMARY

Example embodiments address at least the above problems and/or disadvantages and other disadvantages not described above. Also, the example embodiments are not required to overcome the disadvantages described above, and may not overcome any of the problems described above.

According to an aspect of the disclosure, a method of forecasting a future load by one or more processors, may include: obtaining source data sets and a target data set that have been collected from a plurality of source base stations and a target base station, respectively; among a plurality of source machine learning models configured to predict a communication traffic load of the plurality of source base stations, selecting at least one machine learning source model that has a traffic load prediction performance higher than that of a target machine learning model configured to predict a communication traffic load of the target base station through a negative transfer analysis on the plurality of source base stations; obtaining model weights to be applied to the target machine learning model and the selected at least one source machine learning model via an attention neural network that is jointly trained with the target machine learning model and the selected source machine learning models; obtaining a load forecasting model for the target base station by combining the target machine learning model and the selected at least one source machine learning model according to the model weights; and predicting a future communication traffic load of the target base station based on the load forecasting model.

The method may further include: transmitting information of the future communication traffic load to the target base station to enable the target base station to assign a plurality of user equipment (UEs) to a plurality of cells of the target base station according to the information of the future communication traffic load.

The information of the future communication traffic load may include any one or any combination of a number of active UEs in each of the plurality of cells, a cell load ratio, an internet protocol (IP) throughput per cell, and a cell physical resource block (PRB) usage ratio.

At least one of the target machine learning model, the plurality of source machine learning models, and the load forecasting model may be implemented as a Long Short-Term Memory (LSTM) model that includes an input layer, a plurality of LSTM layers, a dense layer, and an output layer.

The attention neural network may be implemented using a multi-layer perceptron (MLP).

The traffic load prediction performance may be measured by calculating a mean average percentage error (MAPE) of each of the target machine learning model and the selected at least one source machine learning model.

The method may further include: determining whether a target domain from which the target data set is collected, and source domains from which the source data sets are collected, have a same feature space; and prior to obtaining the model weights, performing iterative feature matching on the target data set and the source data sets in response to determining that the target domain and the source domains do not have the same feature space.

The method may further include: inputting the predicted future communication traffic load and a ground truth communication traffic load that is observed from the target base station, to a loss function configured to calculate a mean average percentage error of the load forecasting model; determining whether a performance degradation has occurred in the load forecasting model based on the mean average percentage error of the load forecasting model; and retraining the load forecasting model in response to determining that the performance degradation has occurred in the load forecasting model.

According to another aspect of the disclosure, an electronic device may include at least one memory storing computer-readable instructions; and at least one processor configured to execute the computer-readable instructions to: obtain source data sets and a target data set that have been collected from a plurality of source base stations and a target base station, respectively; among a plurality of source machine learning models configured to predict a communication traffic load of the plurality of source base stations, select at least one machine learning source model that has a traffic load prediction performance higher than that of a target machine learning model configured to predict a communication traffic load of the target base station through a negative transfer analysis on the plurality of source base stations; obtain model weights to be applied to the target machine learning model and the selected at least one source machine learning model via an attention neural network that is jointly trained with the target machine learning model and the selected source machine learning models; obtain a load forecasting model for the target base station by combining the target machine learning model and the selected at least one source machine learning model according to the model weights; and predict a future communication traffic load of the target base station based on the load forecasting model.

The electronic device may further include a transceiver, and the at least one processor may be further configured to execute the computer-readable instructions to: control the transceiver to transmit information of the future communication traffic load to the target base station to enable the target base station to assign a plurality of user equipment (UEs) to a plurality of cells of the target base station according to the information of the future communication traffic load.

The information of the future communication traffic load may include any one or any combination of a number of active UEs in each of the plurality of cells, a cell load ratio, an internet protocol (IP) throughput per cell, and a cell physical resource block (PRB) usage ratio.

At least one of the target machine learning model, the plurality of source machine learning model, and the load forecasting model may be implemented as a Long Short-Term Memory (LSTM) model that includes an input layer, a plurality of LSTM layers, a dense layer, and an output layer.

The attention neural network may be implemented using a multi-layer perceptron (MLP).

The at least one processor may be further configured to execute the computer-readable instructions to: measure the traffic load prediction performance by calculating a mean average percentage error (MAPE) of each of the target machine learning model and the selected at least one source machine learning model.

The at least one processor may be further configured to execute the computer-readable instructions to: determine whether a target domain from which the target data set is collected, and source domains from which the source data sets are collected, have a same feature space; and prior to obtaining the model weights, perform iterative feature matching on the target data set and the source data sets in response to determining that the target domain and the source domains do not have the same feature space.

The at least one processor may be further configured to execute the computer-readable instructions to: input the predicted future communication traffic load and a ground truth communication traffic load that is observed from the target base station, to a loss function configured to calculate a mean average percentage error of the load forecasting model; determine whether a performance degradation has occurred in the load forecasting model based on the mean average percentage error of the load forecasting model; and retrain the load forecasting model in response to determining that the performance degradation has occurred in the load forecasting model.

According to another aspect of the disclosure, a non-transitory computer-readable storage medium having recorded thereon instructions to be executed by at least one processor is provided to perform a method of forecasting a future load. The method may include: obtaining source data sets and a target data set that have been collected from a plurality of source base stations and a target base station, respectively; among a plurality of source machine learning models configured to predict a communication traffic load of the plurality of source base stations, selecting at least one machine learning source model that has a traffic load prediction performance higher than that of a target machine learning model configured to predict a communication traffic load of the target base station through a negative transfer analysis on the plurality of source base stations; obtaining model weights to be applied to the target machine learning model and the selected at least one source machine learning model via an attention neural network that is jointly trained with the target machine learning model and the selected source machine learning models; obtaining a load forecasting model for the target base station by combining the target machine learning model and the selected at least one source machine learning model according to the model weights; and predicting a future communication traffic load of the target base station based on the load forecasting model.

The method may further include: transmitting information of the future communication traffic load to the target base station to enable the target base station to assign a plurality of user equipment (UEs) to a plurality of cells of the target base station according to the information of the future communication traffic load, wherein the information of the future communication traffic load may include any one or any combination of a number of active UEs in each of the plurality of cells, a cell load ratio, an internet protocol (IP) throughput per cell, and a cell physical resource block (PRB) usage ratio.

The method further may include: determining whether a target domain from which the target data set is collected, and source domains from which the source data sets are collected, have a same feature space; and prior to obtaining the model weights, performing iterative feature matching on the target data set and the source data sets in response to determining that the target domain and the source domains do not have the same feature space.

The method may further include: inputting the predicted future communication traffic load and a ground truth communication traffic load that is observed from the target base station, to a loss function configured to calculate a mean average percentage error of the load forecasting model; determining whether a performance degradation has occurred in the load forecasting model based on the mean average percentage error of the load forecasting model; and retraining the load forecasting model in response to determining that the performance degradation has occurred in the load forecasting model.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

Figure 1:
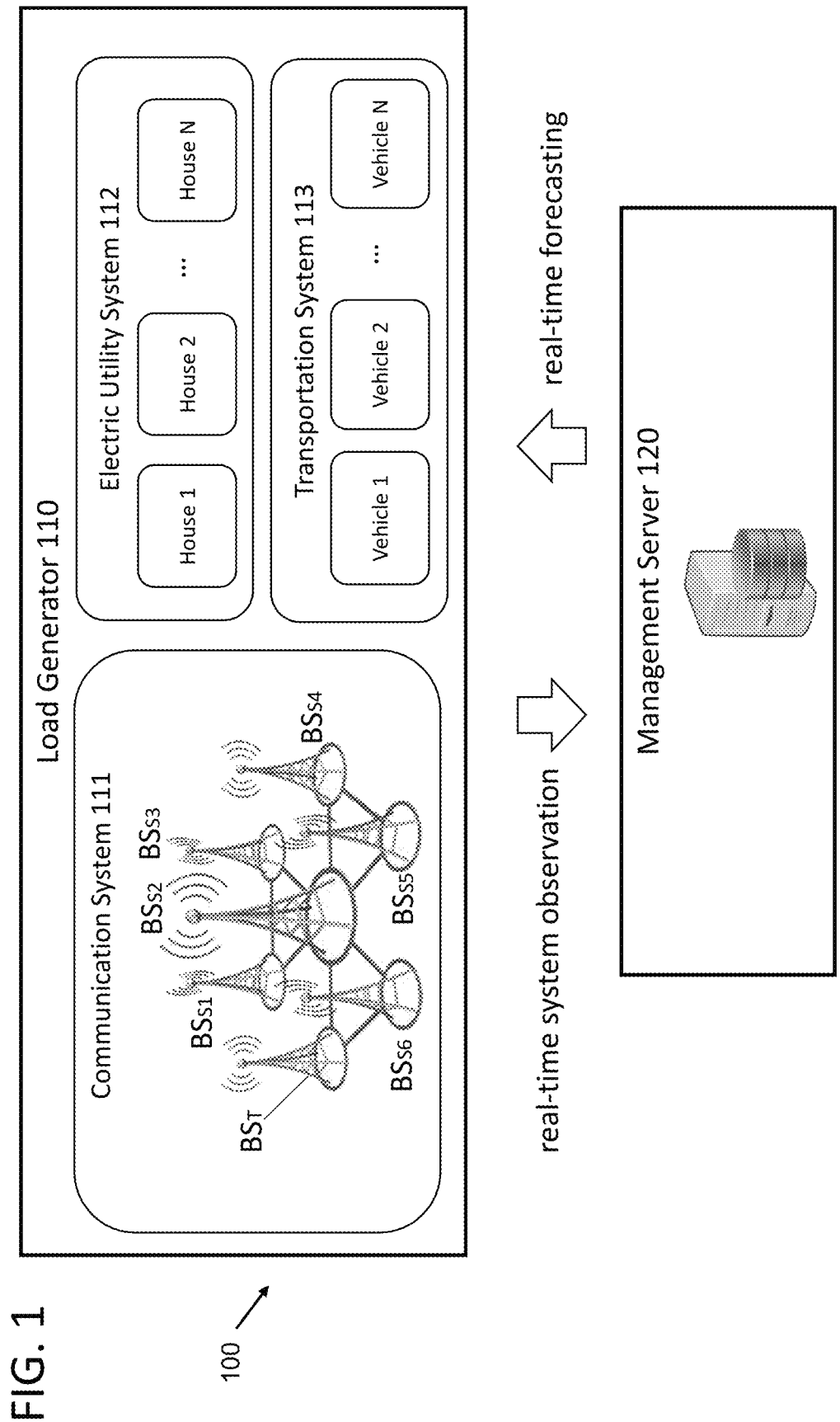
FIG. 1 is a diagram showing a general overview of a system for predicting future loads according to embodiments.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

While such terms as "first," "second," etc., may be used to describe various elements, such elements must not be limited to the above terms. The above terms may be used only to distinguish one element from another.

The term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

Figure 2:
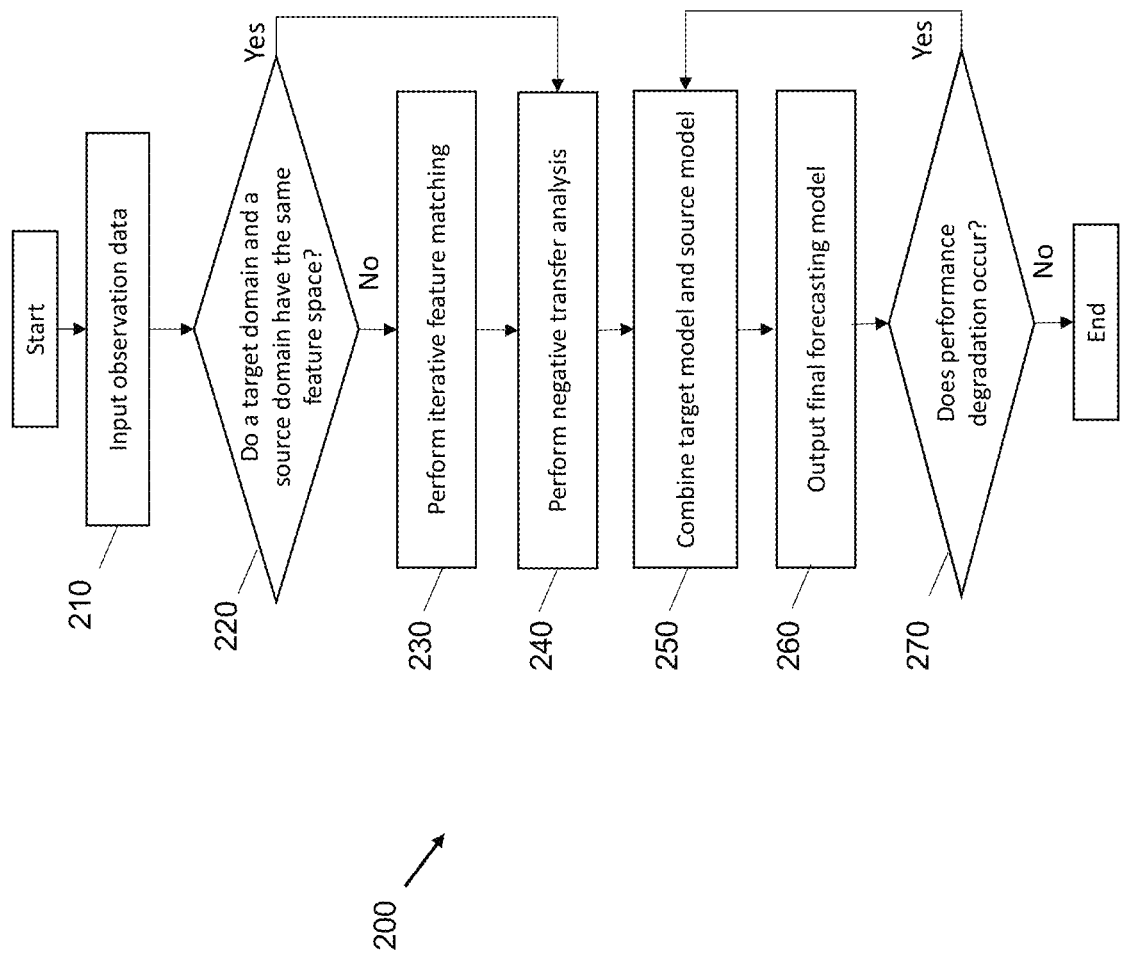
FIG. 2 is a flowchart illustrating a method of predicting communication traffic according to embodiments.

FIG. 1 is a diagram showing a general overview of a system 100 for predicting future loads according to embodiments. FIG. 2 illustrates a flowchart illustrating a method 200 of predicting a future load via the system 100 according to embodiments. The system 100 and the method 200 may be used to forecast any type of load having corresponding information that can be used to predict a future load, and is not limited to the specific example embodiments discussed herein. For example, the system 100 and the method 200 can be used to predict electric loads, communication system traffic loads, transportation traffic loads, and the like.

The system 100 may include a load generator 110 and a management server 120. The load generator 110 may refer to a communication system 111, an electric utility system 112, or a transportation systems 113, but the embodiments of the present disclosure are not limited thereto.

The communication system 111 may include a plurality of base stations $BS_T$ and $BS_{S1}$-$BS_{S6}$, which communicate with the management server 120. Among the plurality of base stations $BS_T$ and $BS_{S1}$-$BS_{S6}$, the base station $BS_T$ may be referred to as a target base station $BS_T$, and base stations $BS_{S1}$-$BS_{S6}$ may be referred to as source base stations $BS_{S1}$-$BS_{S6}$ which provide source data for predicting a future communication load of the target base station $BS_T$. The plurality of base stations $BS_T$ and $BS_{S1}$-$BS_{S6}$ may transmit real-time system observation results to the management server 120, and the management server 120 may predict a future load of the target base station $BS_T$ based on the real-time system observation results. For example, the real-time system observation data may include information of a communication system state, such as a number of active user equipment (UEs) in each cell, a cell load ratio, and an internet protocol (IP) throughput per cell.

The electric utility system 112 may include house 1 through house N that consume electricity, and the management server 120 may obtain historical time sequence data from each of the houses 1-N. One of the house 1-N may be a target house, and the rest of the houses may be source houses that provide historical time sequence data to the management server 120. The management server 120 may predict a future electric load of the target house based on the historical time sequence data of the source houses (in addition to the historical time sequence data of the target house, if any). The target house may be a newly built house and the management server 120 may not have collected sufficient historical electric load consumption data from the target house itself. The management server 120 may use the historical time sequence data of the source houses in addition to the historical time sequence data of the target house, to predict a future electric load of the target house. For example, the historical time sequence data may include electric load consumption data, temperature data, weather data, and the day of the week (e.g. weekday or weekend) corresponding to the houses 1-N. The historical time sequence data are not limited to the above examples, and may include other type of data that may be indicative of future electric load.

The transportation systems113 may include vehicle 1 through vehicle N that causes roadway traffic. One of the vehicles 1-N may be a target vehicle, and the rest of the vehicles may be source vehicles that provide historical traffic patterns to the management server 120. The management server 120 may predict a future transportation traffic load caused by the target vehicle, based on the historical traffic patterns of the source vehicles (in addition to the historical traffic pattern of the target vehicle if any).

For the sake of explanation, the following description of the method 200 will discuss an embodiment that predicts a communication traffic load of a target base station.

As shown in FIG. 2, the method 200 includes operation 210 of inputting observation data to an initial load forecasting model, operation 220 of determining whether a target domain and a source domain have the same feature space, operation 230 of performing iterative feature matching when the target domain and the source domain have different feature spaces, operation 240 of performing a negative transfer analysis for selecting source models, operation 250 of combining the selected source models with a target model to transfer knowledge from the selected source models to the target model, operation 260 of outputting a final load forecasting model, and operation 270 of determining whether performance degradation occurs in the final load forecasting model, compared with the target model performance. The target domain may refer to a domain of interest. The source domain may refer to a domain having a large amount of training data and may transfer knowledge to the target domain via an instance transfer or a parameter transfer. The source models and the target model may be implemented as a Long Short-Term Memory (LSTM) model. The source models and the target model may be also referred to as source machine learning models and a target machine learning model.

In operation 210, the management server 120 may receive real-time system observation data from the communication system 111. The real-time system observation data may include information of a communication system state, such as the number of active UEs in each cell, a cell load ratio, and an internet protocol (IP) throughout per cell.

In operation 220, the management server 120 may compare observation data obtained from a target base station, with observation data obtained from at least one source base station to determine whether a target feature space for the target base station is the same as a source feature space for the at least one source base station.

Figure 3:
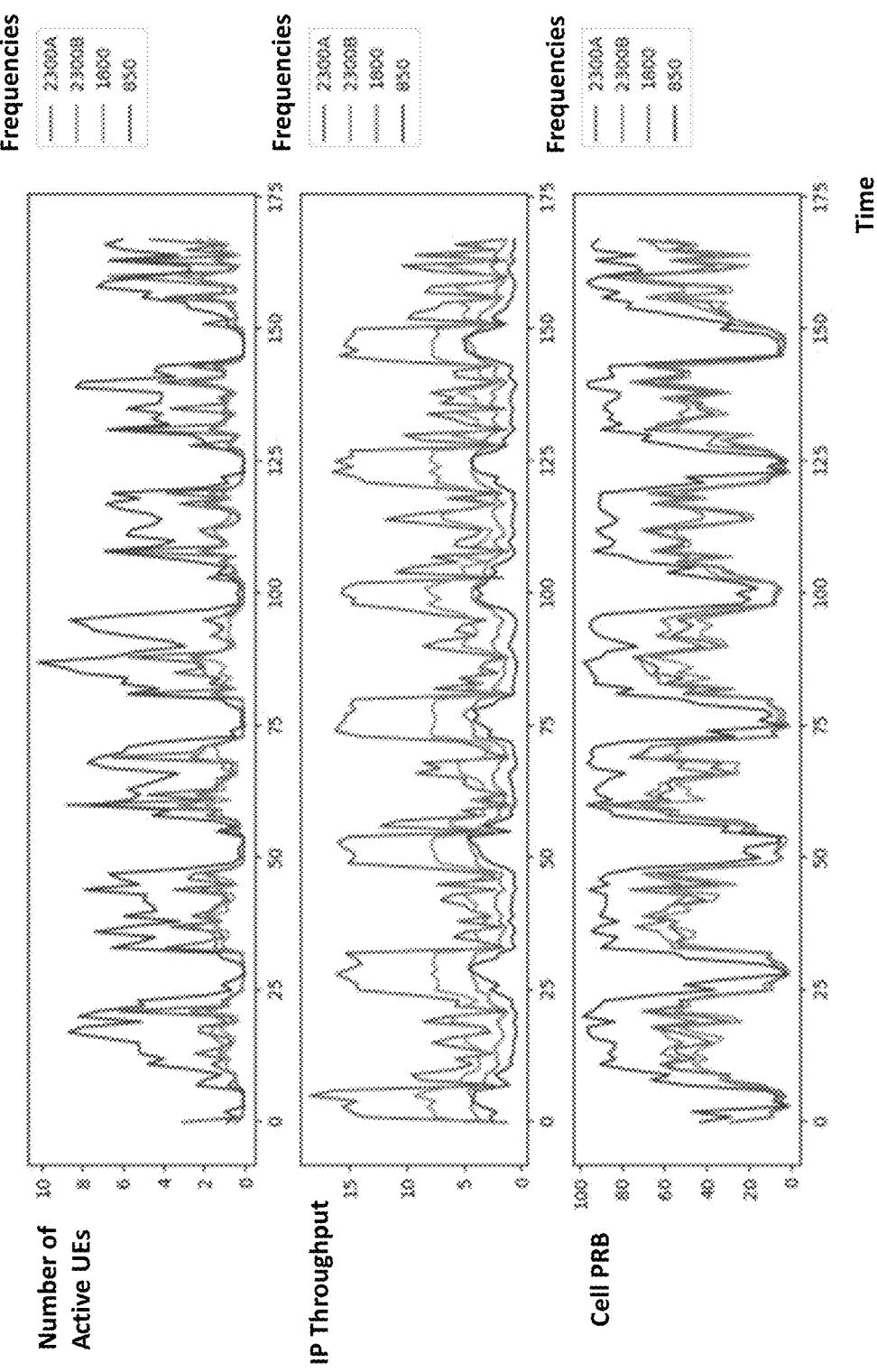
FIG. 3 illustrates examples of data sets that are obtained from base stations operated by the same carrier.
Figure 4:
FIG. 4 illustrates examples of data sets in different feature spaces that are obtained from base stations operated by different carriers.

FIGS. 3 and 4 illustrate examples of observation data that are collected from the target base station and the at least one source base station.

As shown in FIG. 3, data regarding a number of active UEs, an IP throughput, and a cell physical resource block (PRB) usage ratio, may be collected from a single base station or multiple base stations that are operated by the same communication network carrier (also referred to as a wireless service provider, a wireless carrier, or a cellular company). Referring to the graphs of FIG. 3, traffic distribution in one base station may not be stable or constant over time, and may also be different for different frequency levels. In an embodiment, the same type of data collected from base stations operated by the same communication network carrier may be considered as being in the same feature space.

Referring to FIG. 4, different types of traffic load related data may be collected from base stations operated by different communication network carriers.

For example, data regarding a number of active UEs per second, an IP throughput per second, UE behavior (e.g., text usage, data usage, etc.) may be collected from a first base station operated by communication network carrier 1. Data regarding a number of active UEs per minute and an IP throughput per minute may be collected from a second base station operated by communication network carrier 2, but data regarding UE behavior may not be obtained from the second base station. In an embodiment, the number of active UEs per second and the number of active UEs per minute may be considered as being in the same feature space, and the IP throughput per second and the IP throughput per minute may be considered as being in the same feature space. However, depending on settings, the data collected at different time intervals may be considered as being in different feature spaces. The data regarding UE behavior that is collected from the first base station may be determined to be in the different feature space since such data is not available in the second base station.

Referring back to FIG. 2, when the target domain and the at least source domain have the same feature space, the method 200 skips operation 230 and proceeds to operation 240 to perform a homogeneous transfer learning algorithm including operations 240-270. When the target domain and the source domain have different feature spaces, the method 200 proceeds to operation 230 to perform a heterogeneous transfer learning algorithm including operations 230-270.

In operation 230, the management server 200 may identify a shared feature data set and a self-owned data set from a source domain data set, based on comparison between the source domain data set and a target domain data set. For example, a vector data set $D_1$ from source domain D may be split into two data sets, a shared feature data set $D_{1,1}$ in a shared feature space and a self-owned feature data set $D_{1,2}$ in a self-owned feature space. The shared feature data set $D_{1,1}$ may contain features common to the ith source domain and the target domain. The self-owned feature data set $D_{1,2}$ may contain features that are available only for the ith source domain.

In operation 240, the management server 200 may perform a negative transfer analysis on a plurality of source models to select one or more source models suitable for knowledge transfer. Further detailed description of operation 240 will be provided with reference to FIG. 5 below.

In operation 250, the management server 200 may combine the selected one or more source models and a target model via joint training of the selected one or more source models, the target model, and an attention neural network that applies weights to the selected one or more source models and the target model, respectively. Further detailed description of operation 240 will be provided with reference to FIG. 6 below.

In operation 260, the management server 200 may output a combined model of the selected one or more source models and the target model, as a final forecasting model.

In operation 270, the management server 200 may check if performance degradation has occurred in the final forecasting model, based on comparison between performance of the target model and performance of the final forecasting model. In particular, a mean average percentage error (MAPE) may be measured from the target model and the final forecasting model to determine whether performance degradation has occurred in the final forecasting model.

If performance degradation has occurred in the final forecasting model, the method 200 proceeds to operation 250 to combine the target model and the source model in a different manner from the previous combination operation, by adjusting model weights output from the attention neural network. Further detailed description of operations 250-270 will be provided with reference to FIGS. 6 and 7 below.

Figure 5:
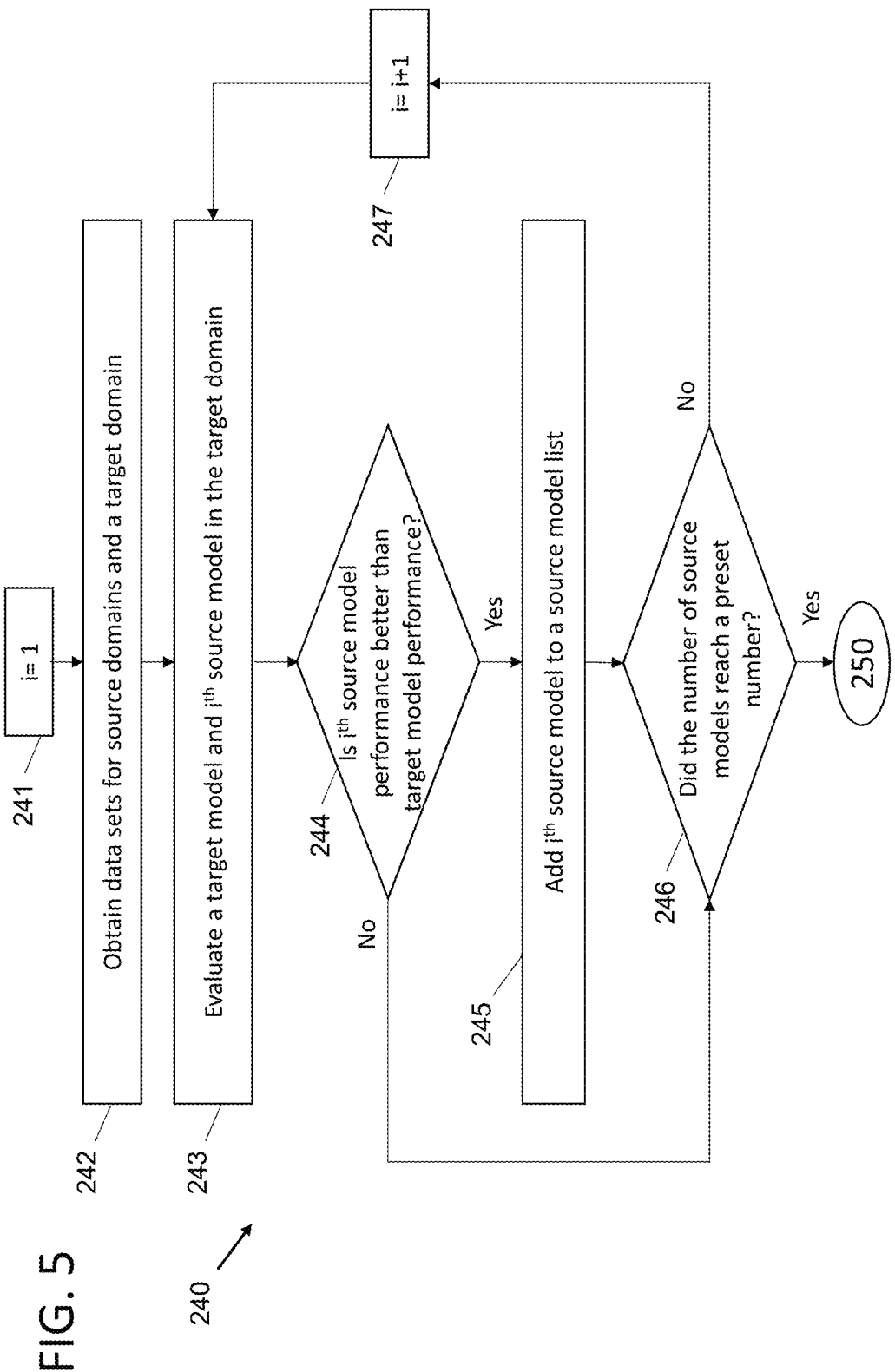
FIG. 5 is a flowchart illustrating a method of performing a negative transfer analysis according to embodiments.

FIG. 5 is a flowchart illustrating a method 240 of performing a negative transfer analysis according to embodiments.

A practical challenge in real world load forecasting is the lack of sufficient data to learn a reliable forecasting model. One embodiment utilizes knowledge learned from source base stations with a large amount of training data to improve the load forecasting for the target base station. Specifically, forecasting models that have learned on the source base stations may be reused to forecast the load of the target base station. However, regardless of the homogenous or heterogeneous nature of input features, if the data distribution difference between the source base stations and the target base station is too large then direct knowledge transfer from the source models to the target model may result in performance degradation. This is referred to as negative transfer and has been recognized as one of the core issues for transfer learning algorithms. According to embodiments of the present disclosure, a negative transfer analysis is utilized to identify potential sources of negative transfer and exclude them from the set of sources. Through the negative transfer analysis, only the source models that achieve a better prediction performance in the target domain, than the target model, may be used in the next stage (e.g., operations 250 and 260 in FIG. 2).

Referring to FIG. 5, the method 240 of performing a negative transfer analysis may include operation 241 of setting a parameter i that represents an identification of a source model. For example, i is set to a value of 1 to determine whether a 1st source model has knowledge or data that is suitable to transfer to a target model. Here, the source model may have already been trained using data obtained from a corresponding base station, and may have a fixed structure and fixed parameters, but the embodiment of the disclosure is not limited thereto. For example, the source model may be further trained or updated.

In operation 242, source data sets are obtained from source base stations in source domains, and a target data set is obtained from a target base station in a target domain.

In operation 243, performance of an ith source model, which has been trained using the source data set from an ith source base station, and a target model which has been trained using the target data set from the target base station, are evaluated in the target domain, using the target data set from the target base station. The source model and the target model may be linear regression models that use an LSTM algorithm. Performance of the source model and the target model may be measured using a loss function that represents a difference between a predicted communication traffic load and a ground-truth communication traffic load (which is observed from the target base station). For example, a mean average percentage error (MAPE) may be used as a loss function of the target model and the source model.

In operation 244, the performance of the $i^{th}$ source model is compared with the performance of the target model, to determine whether the source model performance is better than the target model performance. For example, if a prediction loss of the source model is lower than that of the target model, the itn source model is determined to have a better performance than the target model.

If the source model performance is better than the target model performance, the method 240 proceeds to operation 245 to add the source model to a source model list. If the $it^{th}$ source model performance is not better than the target model performance, the method 240 may skip operation 245 and may proceed to operation 246.

Once the $it^{th}$ source model performance is added to the source model list in operation 245, the method 240 proceeds to operation 246 in which the number of source models in the source model list is checked to determine whether the number of source models in the source model list has reached a preset number.

If the number of source models in the source model list has not reached the preset number, the parameter i is updated to have a value of i+1 in operation 247.

The method 240 may proceed to operation 243 to evaluate performance of an $i+1^{th}$ source model (e.g., a 2nd source model) in comparison to the target model performance. Operations 243-247 may be iteratively performed until the number of source models in the source model list reaches the present number.

Although FIG. 5 illustrates that source models are evaluated one by one, the embodiment is not limited thereto. For example, the loss value of each of the source models is calculated in parallel, and the present number of source models are selected at once based on comparison between the loss value of each source model and the lost value of the target model.

Figure 6:
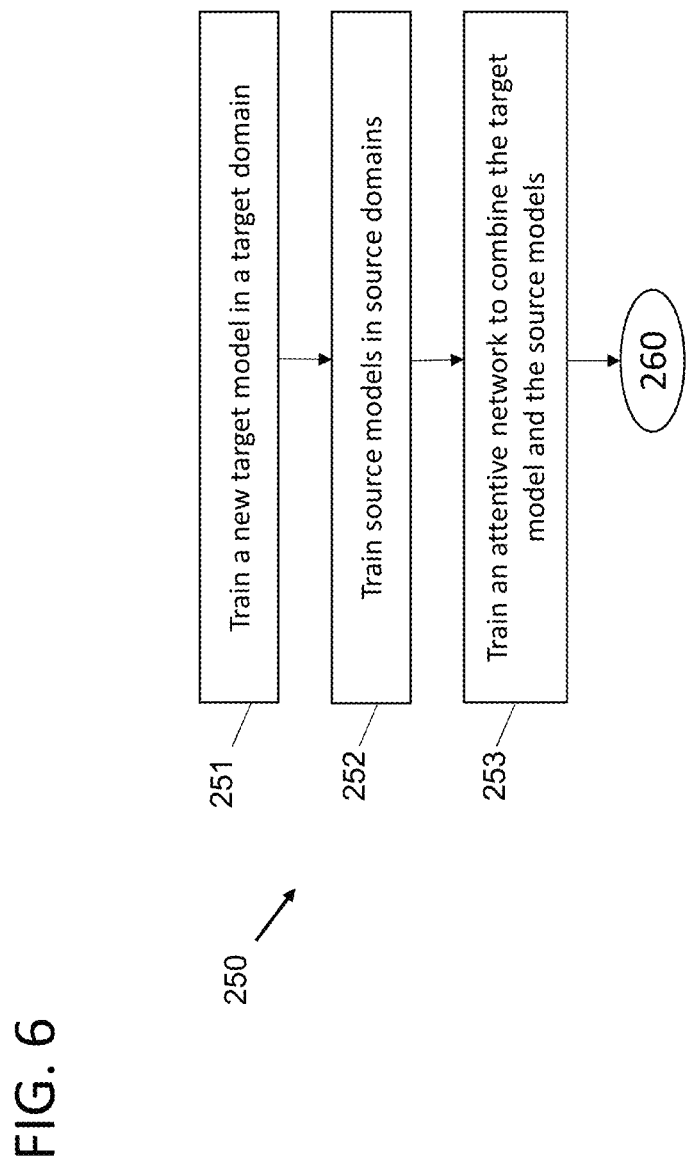
FIG. 6 is a flowchart illustrating a method of combining a target model and source models according to embodiments.

FIG. 6 is a flowchart illustrating a method 250 of combining a target model and source models according to embodiments.

The method 250 may include operation 251 of training a new target model in a target domain. For example, when a new base station is added to the communication system 111, an LSTM-based linear regression model may be added as a new target model for predicting a future traffic load of the new base station. The target model is trained based on data collected from the new base station in the target domain.

The method 250 may include operation 252 of training source models in source domains. Operation 252 does not necessarily have to occur after operation 251, and the source models may already have been trained based on previously collected historical observation data that are collected from existing base stations in the communication system 111.

The method 250 may include operation 253 of training an attention neural network to determine weights for combining the target model and the source models. The attention neural network may be implemented using a multi-layer perceptron (MLP).

In operation 253, the attention neural network, the source models, and the target model receive the same input features (e.g., observation data collected from the target base station). The attention neural network determines relative weights for the target model and the source models. The attention neural network outputs attention scores for the target model and the source models, and the attention scores are transformed to the weights for the target model and the source models. For example, the attention score eb for the target model and the attention scores est, est, esn for the source models are transformed to the weight $W_b$ applied to the target model and the weights $W_{s1}$, $W_{s2}$, $W_{sn}$ applied to the source models, according to the following equations (1) and (2):

$$w_{si} = \frac{\exp(e_{si}, x)}{\sum_{i=1}^{n} \exp(e_{si}, X) + \exp(e_b, X)} \quad (1)$$

$$w_b = \frac{\exp(e_b, x)}{\sum_{i=1}^{n} \exp(e_{si}, X) + \exp(e_b, X)} \quad (2)$$

Where $\Sigma_{i=1}^{n} w_{si} + w_b = 1$, and $w_{si}, w_b \in [0, 1]$.

Both the target model and the attention neural network are optimized to minimize the loss (e.g., a mean average percentage error) between a predicted value ŷ and a real observation value y over training samples obtained from the target domain. For example, the target model and the attention neural network may be optimized using the loss function:

$$L(y'_i, y_i; \Theta) = \frac{1}{n} \sum_{i=1}^{i=N} |y'_i - y_i| \quad (3)$$

The final forecasting model obtained in operation 260 may be represented as a weighted average of the selected source models and the target model. For example, the output of the final forecasting model may be calculated based on the following equation:

$$F_T = w_b * F_b + \sum_{i=1}^{n} w_{si} * F_i \quad (4)$$

According to an embodiment of the present disclosure, pseudo code for a homogeneous transfer learning algorithm is provided as follows.

---

Algorithm 1 TATR: Two-stage Attentive knowledge Transfer based Regression

---

Input: Data sets for S homes, $\mathcal{D}_1, \ldots, \mathcal{D}_S$, Data set $\mathcal{T}$ for the target domain.

1: Obtain the normalized load for all the homes

Negative Transfer Analysis

2: Learn a linear forecasting model on the target domain g

3: for i = 1, . . . , S do

4:   Learn a linear source model $f_i$ on source i

5:   Compare the performance of $f_i$ with g on the target domain

Stage 1   6:   if $f_i$ achieves better performance than g then

7:     Add Source i to the final source set SN

8:   end if

9: end for

Learn the LSTM source models

10: for si = 1, . . . , sn do

11:   Learn an LSTM based source model $LSTM_{si}$

12: end for

Second Stage

13: Learn the base LSTM model LSTM_b

Stage 2   14: Learn the attention network via optimizing Equation (3)

Output: The final out is determined by Equation (4)

In stage 1 of the homogeneous transfer learning algorithm, a negative transfer analysis is performed according to operations 210 and 240 to select source models suitable to transfer knowledge to a target model.

In stage 2 of the homogeneous transfer learning algorithm, an attention neural network is trained to learn weights for combining the selected source models and the target model, according to operations 250 and 260.

According to another embodiment of the present disclosure, pseudo code for a heterogeneous transfer learning algorithm is provided as follows.

---

Algorithm 2 He-TATR: Heterogeneous Two-stage Attentive knowledge Transfer based Regression

Input: Data sos for S homes, $\mathcal{D}_1, \ldots, \mathcal{D}_S$, Data set $\mathcal{T}$ for the target domain.
1: Obtain the normalized load for all the homes

Share feature space analysis

Stage 0
2: for i = 1, ..., S do
3: Split the data set $\mathcal{D}_i$ into shared feature data set ($\mathcal{D}_{i,1}$) and self-owned data set ($\mathcal{D}_{i,2}$)
4: end for

Negative Transfer Analysis
5: Learn a linear forecasting model on the target domain g
6: for i = 1, ..., S do

Stage 1
7: Learn a linear source model $f_i$ on the shared feature $\mathcal{D}_{i,1}$ of source i
8: Compare the performance of $f_i$ with g on the target domain
9: if $f_i$ achieves better performance than g then
10: Add Source i to the final source set SN
11: end if
12: end for

Learn the LSTM source models
13: for si = 1, ..., sn do
14: Learn an LSTM based source model $LSTM_{si}$ on $\mathcal{D}_{i,1}$
15: end for

Second Stage
16: Learn the base LSTM model LSTM_b

Stage 2
17: Learn the attention network via optimizing Equation (3)
Output: The final out is determined by Equation (4)

---

In stage 0, iterative feature mapping may be performed according to operation 230 to find shared source data sets and self-owned source data sets, and thereby to perform stage 1 and stage 2 using only the shared source data sets.

Figure 7:
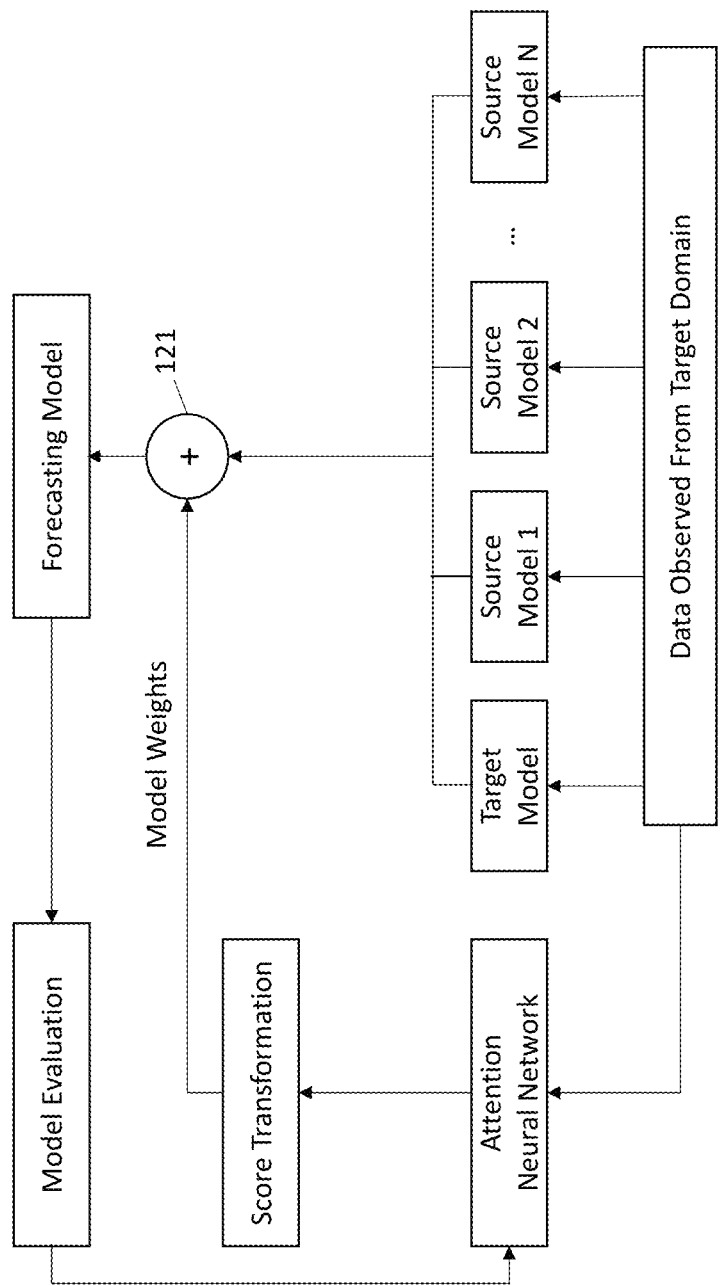
FIG. 7 illustrates a diagram of an operation of combining a target model and source models according to embodiments.

FIG. 7 illustrates a diagram illustrating data flow for performing operations 250-270 to combine a target model and source models and output a final forecasting model in an iterative manner according to embodiments.

Regarding FIG. 7, system observation data are obtained from a target base station, and are fed into an attention neural network, a target model for a target base station, and one or more source models 1-N for source base stations. The system observation data may include information about a number of active UEs, an IP throughput, and/or a cell PRB usage ratio of the target base station. The one or more source models 1-N may be source models that are selected from (all or some) available source models (e.g., source models for source base stations $BS_{S1}$-$BS_{S6}$ in the communication system 111) via a negative transfer analysis.

Each of the target model and the source models 1-N outputs their own prediction value of the future communication traffic load of the target base station, based on the system observation data obtained from the target base station.

The attention neural network outputs attention scores for the target model and the source models 1-N based on the system observation data obtained from the target base station. The attention scores are transformed to weights $W_b$, $W_{s1}$, $W_{s2}$, ... $W_{sn}$ to be applied to the target model and the source models, respectively, in combining the target model and the source models 1-N via an adder 121.

The adder 121 may output a combination of the target model and the source models 1-N as a final forecasting model. The final forecasting model may output, as a final prediction result, a weighted sum of the target model and the source models based on the weights $W_b$, $W_{s1}$, $W_{s2}$, ..., and $W_{sn}$.

The final forecasting model is evaluated to check if the performance of the final forecasting model is better than the performance of the target model. If the performance of the final forecasting model is not better than the performance of the target model, feedback is provided to the attention neural network so that the attention neural network adjusts the attention scores for the target model and the source models 1-N, and thereby the final forecasting model is updated based on adjusted weights that correspond to the adjusted scores.

In an embodiment, each of the target model and the source models may be implemented as an LSTM model.

Figure 8:
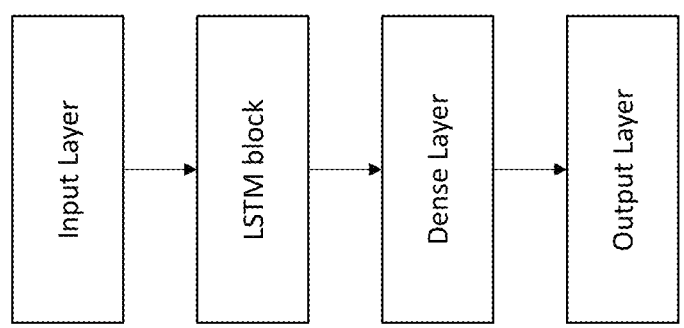
FIG. 8 illustrates a diagram of a neural network structure of a LSTM model according to embodiments.

FIG. 8 illustrates a diagram of an LSTM model for predicting a future communication traffic load according to an embodiment.

As shown in FIG. 8, the LSTM model may include an input layer, an LSTM block that may include multiple LSTM layers, a dense layer, and an output layer including the output of different tasks. For example, the tasks may correspond to source models and a target model. The LSTM block and the dense layer may be shared across learning tasks.

To perform short-term load forecasting for a target base station using a target model, predictive information may be input into the input layer of the LSTM model. For example, data indicating a number of active UEs, an IP throughput, and/or a cell PRB usage ratio of the target base station may be input into the input layer.

The input data may then be fed into the LSTM block. Depending on the nature of the data, the LSTM blocks may be composed of different numbers of LSTM layers. An LSTM layer may have a memory cell structure including an input gate, a forget gate, and an output gate.

The output of the LSTM blocks may then be fed into a fully connected NN output layer. Multi-task learning may be provided by jointly predicting multiple outputs, with each of the outputs of the output layer corresponding to one of the single learning tasks. Depending on the details of the forecasting tasks, there may be different inputs and outputs.

Figure 9:
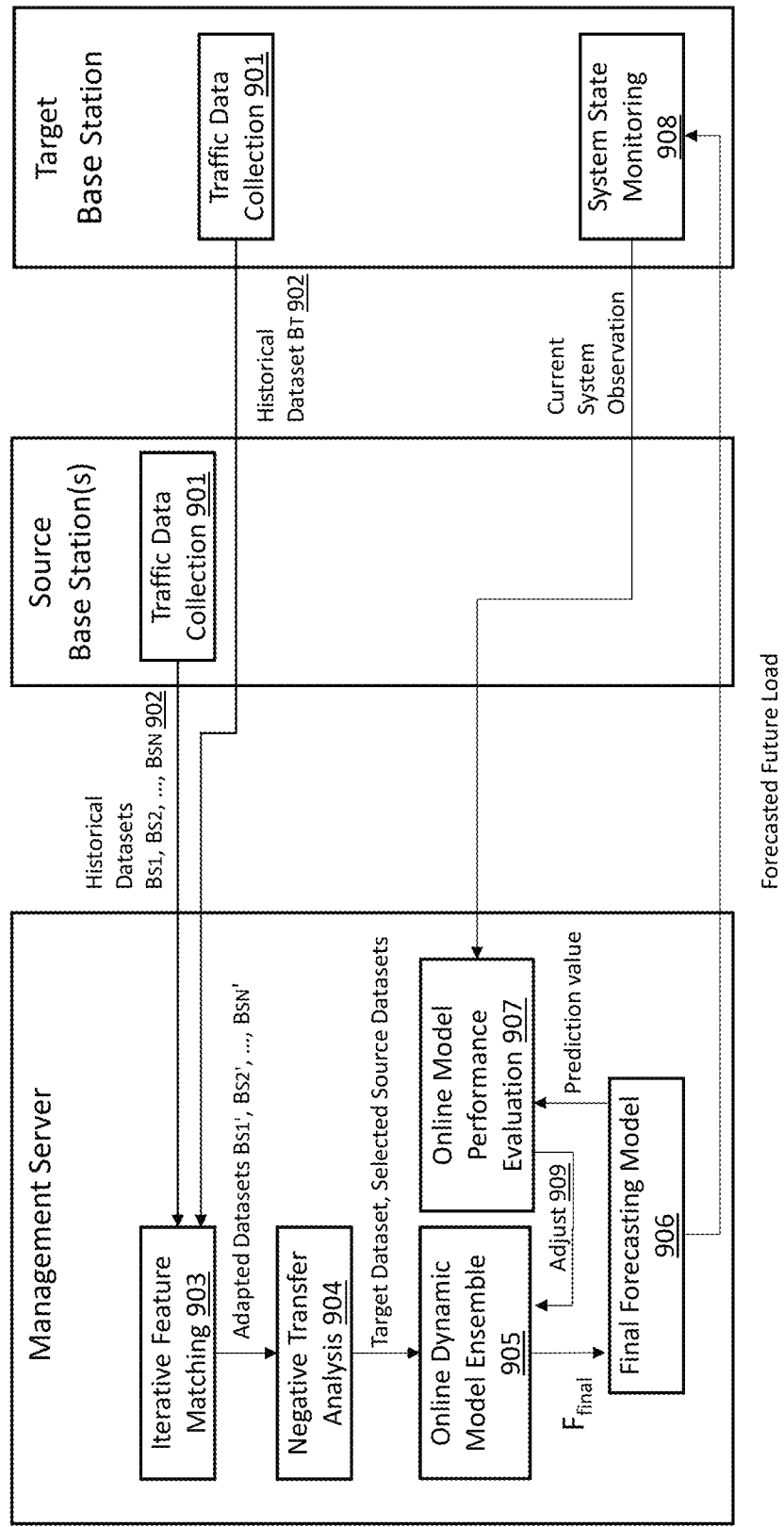
FIG. 9 is a detailed diagram of a system for predicting communication traffic via communication between a management server, a source base station, and a target base station, according to embodiments.

FIG. 9 is a detailed diagram of a system for predicting a communication traffic load of a target base station via interactions between a management server, source base station(s), and the target base station, according to embodiments.

As shown in FIG. 9, the source base stations collect traffic data $B_{S1}$, $B_{S2}$, ..., $B_{SN}$, respectively, and the target base station collects traffic data $B_T$ in operation 901. The collected traffic data $B_{S1}$, $B_{S2}$, ..., $B_{SN}$, and $B_T$ may be historical datasets. The historical datasets may include information about a number of active UEs in each of the plurality of cells, a cell load ratio, an internet protocol (IP) throughout per cell, a cell physical resource block (PRB) usage ratio, and/or user behavior.

The source historical datasets $B_{S1}$, $B_{S2}$, ..., $B_{SN}$, and the target historical dataset $B_T$ may be transmitted from the source base stations and the target base station to the management server in operation 902.

The management server may perform iterative feature matching on the source historical datasets $B_{S1}$, $B_{S2}$, ..., $B_{SN}$, and the target historical dataset $B_T$ to obtain adapted source historical datasets $B_{S1}'$, $B_{S2}'$, ..., $B_{SN}'$ if the source historical datasets $B_{S1}$, $B_{S2}$, ..., $B_{SN}$, and the target historical dataset $B_T$ have different feature spaces, in operation 903. Operation 903 may correspond to operation 230 in FIG. 2.

The management server may perform a negative transfer analysis on the adapted source historical datasets $B_{S1}'$, $B_{S2}'$, ..., $B_{SN}'$ to select source models that have been trained using source datasets that provide a higher prediction performance than a target model that predicts a future load using the target historical dataset $B_T$, in operation 904. Operation 904 may correspond to operation 240 in FIG. 2.

The management server may combine the selected source models and the target model using an attention neural network configured to provide model weights for linearly combining the selected source models and the target model, in operation 905. Operation 905 may correspond to operation 250 in FIG. 2.

The management server may output the combined model as a final forecasting model for predicting a future communication traffic load of the target base station, in operation 906. Operation 906 may correspond to operation 260 in FIG. 2.

The management server may determine whether a performance degradation has occurred in the final forecasting model, based on comparison between the prediction accuracy of the final forecasting model and the prediction accuracy of the target model, in operation 907. In calculating the prediction accuracy, the management server obtains real-time system observation data from the target base station as a ground-truth communication traffic load at a target prediction time, in operation 908. For example, when the final forecasting model predicts a communication traffic load of the target base station for a future time point T1, the management server may use a communication traffic load that is observed later by the target base station at time point T1 as the ground-truth communication traffic load. If the management server determines that the performance of the final forecasting model has degraded, the management server provides feedback data to the attention neural network so that the attention neural network adjusts the model weights, in operation 909. Operations 907-909 may correspond to operation 270 in FIG. 10 is a block diagram of an electronic device 1000 according to embodiments.

Figure 10:
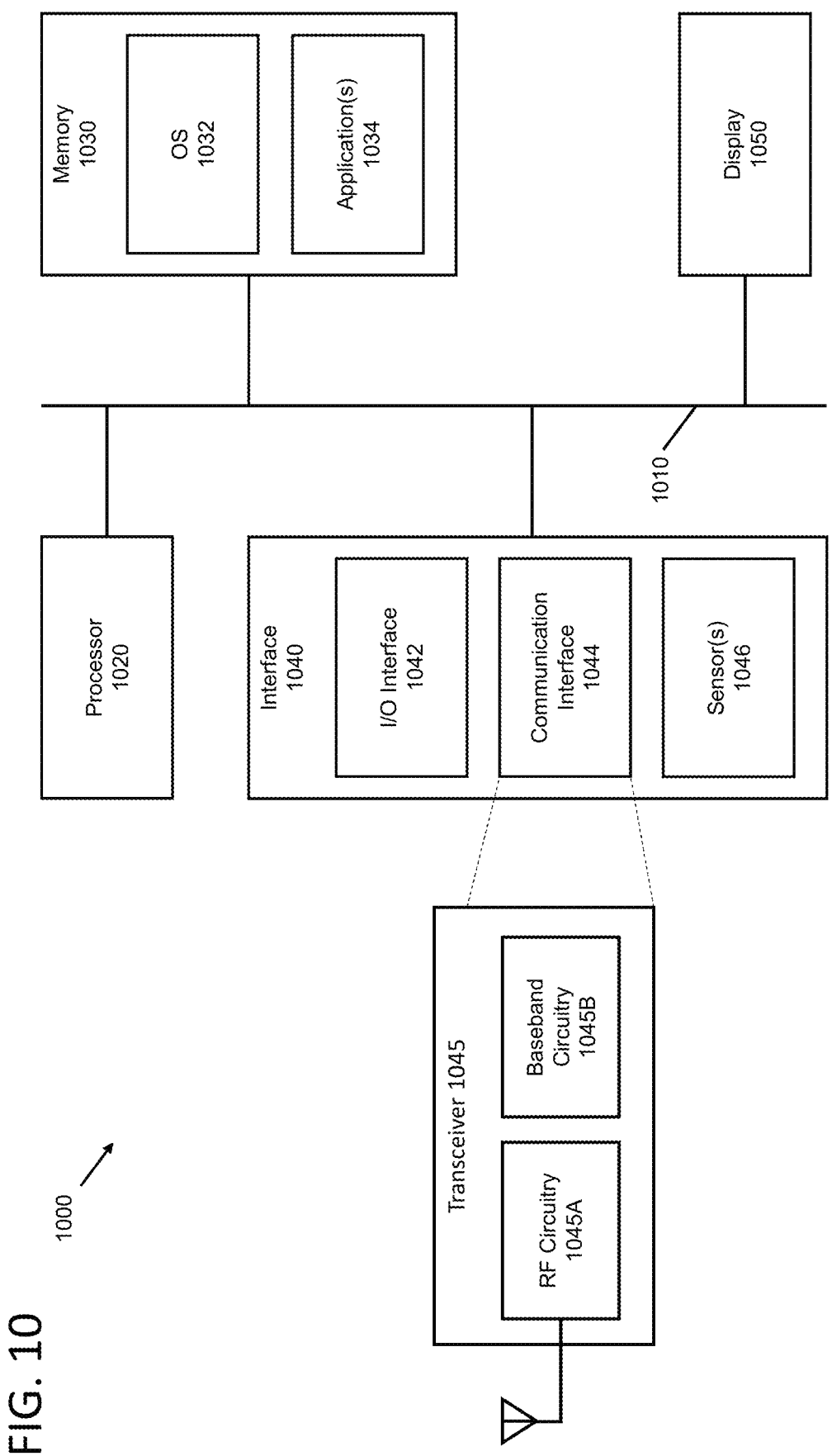
FIG. 10 is a block diagram of an electronic device according to embodiments.

FIG. 10 is for illustration only, and other embodiments of the electronic device 1000 could be used without departing from the scope of this disclosure. For example, the electronic device 1000 may correspond to a client device (e.g., a base station included in the communication system 111) or a server (e.g., the management server 120).

The electronic device 1000 includes a bus 1010, a processor 1020, a memory 1030, an interface 1040, and a display 1050.

The bus 1010 includes a circuit for connecting the components 1020 to 1050 with one another. The bus 1010 functions as a communication system for transferring data between the components 1020 to 1050 or between electronic devices.

The processor 1020 includes one or more of a central processing unit (CPU), a graphics processor unit (GPU), an accelerated processing unit (APU), a many integrated core (MIC), a field-programmable gate array (FPGA), or a digital signal processor (DSP). The processor 1020 is able to perform control of any one or any combination of the other components of the electronic device 1000, and/or perform an operation or data processing relating to communication. For example, the processor 1020 performs operations 210-270 illustrated in FIG. 2. The processor 1020 executes one or more programs stored in the memory 1030.

The memory 1030 may include a volatile and/or non-volatile memory. The memory 1030 stores information, such as one or more of commands, data, programs (one or more instructions), applications 1034, etc., which are related to at least one other component of the electronic device 1000 and for driving and controlling the electronic device 1000. For example, commands and/or data may formulate an operating system (OS) 1032. Information stored in the memory 1030 may be executed by the processor 1020.

In particular, the memory 1030 stores data, computer-readable instructions, applications, and setting information for the operation of base stations of the communication system 111. The memory 1030 may store information on a bearer allocated to an accessed UE and a measurement result reported from the accessed UE.

The applications 1034 include the above-discussed embodiments. These functions can be performed by a single application or by multiple applications that each carry out one or more of these functions. For example, the applications 1034 may include an artificial intelligence (AI) model for performing operations 210-270.

The display 1050 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 1050 can also be a depth-aware display, such as a multi-focal display. The display 1050 is able to present, for example, various contents, such as text, images, videos, icons, and symbols.

The interface 1040 includes input/output (I/O) interface 1042, communication interface 1044, and/or one or more sensors 1046. The I/O interface 1042 serves as an interface that can, for example, transfer commands and/or data between a user and/or other external devices and other component(s) of the electronic device 1000.

The communication interface 1044 may include a transceiver 1045 to enable communication between the electronic device 1000 and other external devices (e.g., communication between the management server 120 and base stations in the communication system 111, communication between the management server 120 and the electric utility system 112, and communication between the management server 120 and the transportation system 113), via a wired connection, a wireless connection, or a combination of wired and wireless connections. The communication interface 1044 may permit the electronic device 1000 to receive information from another device and/or provide information to another device. For example, the communication interface 1044 may include an Ethernet interface, an optical interface, a coaxial interface, an infrared interface, a radio frequency (RF) interface, a universal serial bus (USB) interface, a Wi-Fi interface, a cellular network interface, or the like.

The transceiver 1045 of the communication interface 1044 may include a radio frequency (RF) circuitry 1045A and a baseband circuitry 1045B.

The baseband circuitry 1045B may transmit and receive a signal through a wireless channel, and may perform band conversion and amplification on the signal. The RF circuitry 1045A may up-convert a baseband signal provided from the baseband circuitry 1045B into an RF band signal and then transmits the converted signal through an antenna, and down-converts an RF band signal received through the antenna into a baseband signal. For example, the RF circuitry 1045A may include a transmission filter, a reception filter, an amplifier, a mixer, an oscillator, a digital-to-analog converter (DAC), and an analog-to-digital converter (ADC).

The transceiver 1045 may be connected to one or more antennas. The RF circuitry 1045A of the transceiver 1045 may include a plurality of RF chains and may perform beamforming. For the beamforming, the RF circuitry 1045A may control a phase and a size of each of the signals transmitted and received through a plurality of antennas or antenna elements. The RF circuitry 1045A may perform a downlink multi-input and multi-output (MIMO) operation by transmitting one or more layers.

The baseband circuitry 1045A may perform conversion between a baseband signal and a bitstream according to a physical layer standard of the radio access technology. For example, when data is transmitted, the baseband circuitry 1045B generates complex symbols by encoding and modulating a transmission bitstream. When data is received, the baseband circuitry 1045B reconstructs a reception bitstream by demodulating and decoding a baseband signal provided from the RF circuitry 1045A.

The sensor(s) 1046 of the interface 1040 can meter a physical quantity or detect an activation state of the electronic device 1000 and convert metered or detected information into an electrical signal. For example, the sensor(s) 1046 can include one or more cameras or other imaging sensors for capturing images of scenes. The sensor(s) 1046 can also include any one or any combination of a microphone, a keyboard, a mouse, and one or more buttons for touch input. The sensor(s) 1046 can further include an inertial measurement unit. In addition, the sensor(s) 1046 can include a control circuit for controlling at least one of the sensors included herein. Any of these sensor(s) 1046 can be located within or coupled to the electronic device 1000.

Referring back to the processor 1020, the processor 1020 may transmit and receive signals through the RF circuitry 1045A and the baseband circuitry 1045B. The processor 1020 may record data in the memory 1030 and read the data from the memory 1030.

For example, when the electronic device 1000 corresponds to the management server 120, the processor 1020 may receive from the communication system 111, information about a number of active UEs that are served by each cell of the base stations, a cell load ratio, and an internet protocol (IP) throughput per cell, and may store the information of the number of active UEs, the cell load ratio, and the PI throughput per cell, in the memory 1020. The processor 1020 may control the transceiver 1045 to transmit a request for communication system state information to the communication system 111, and to receive from the management server 120 the information of the number of active UEs, the cell load ratio, and the IP throughput per cell, in response to the request from the communication system state information. The processor 1020 may perform operations 210-270 based on the communication system state information, and may transmit a forecasted communication traffic load of a target base station (e.g., a target base station $BS_T$ illustrated in FIG. 1) or a forecasted communication traffic load of each of a plurality of cells of the target base station to the communication system 111. The communication system 112 may allocate UEs to the plurality of base stations of the communication system 111 or to the plurality of cells of the target base station, according to the forecasted communication traffic load, so that traffic loads are distributed relatively evenly among the plurality of base stations, and/or among the plurality of cells of the target base station.

Figure 11:
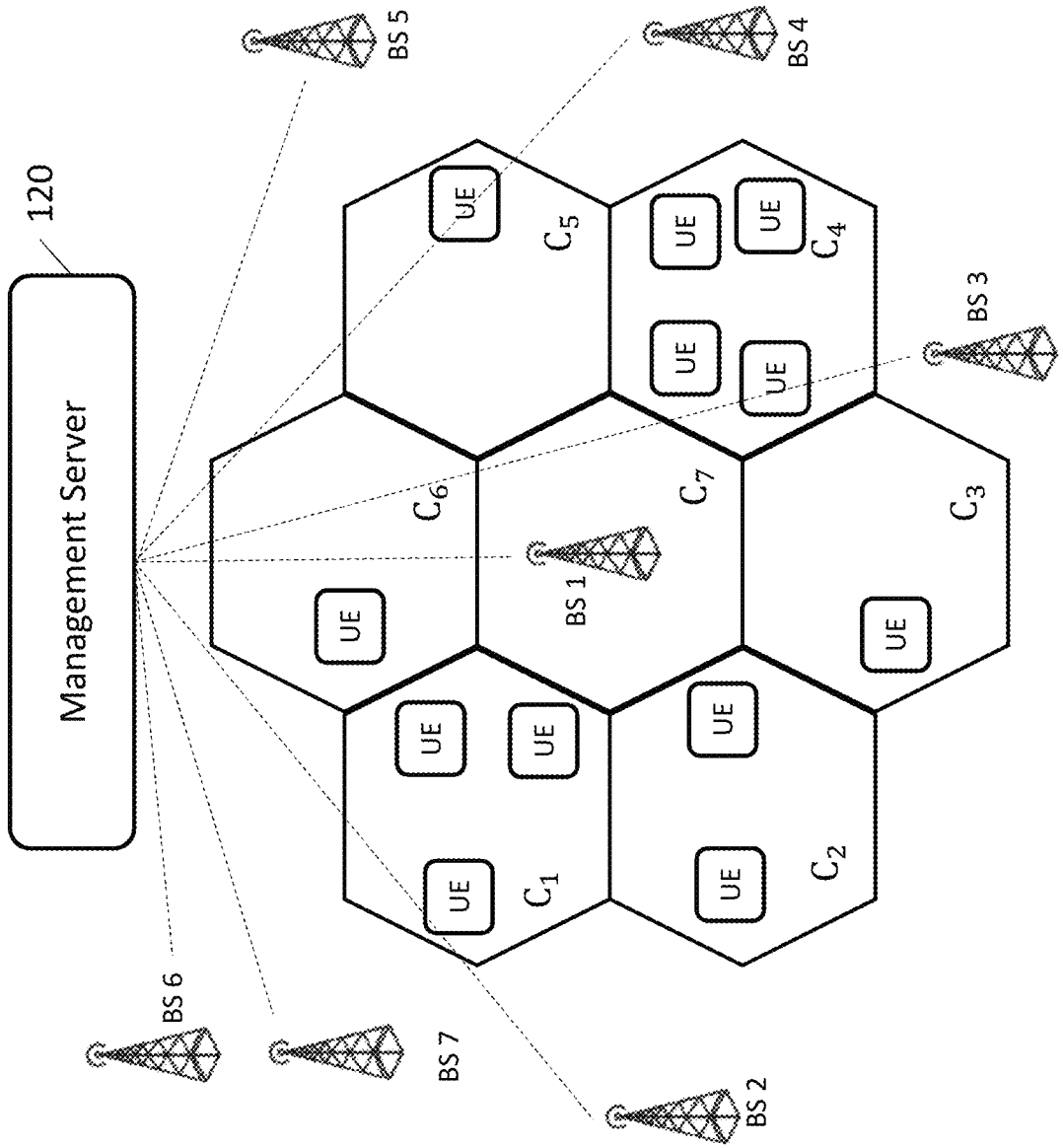
FIG. 11 illustrates a use application in which a management server performs traffic load balancing between different communication cells, according to embodiments.

FIG. 11 illustrates a use application in which a management server performs traffic load balancing between different communication cells, according to embodiments.

FIG. 11 illustrates a use application in which a management server 120 performs traffic load balancing between different communication cells, according to embodiments.

Referring to FIG. 11, a system for performing traffic load balancing according to an example embodiment includes a management server 120, a plurality of base stations BS1-BS7 each of which serves a plurality of cells having different cell reselection priorities, and a plurality of UEs that are respectively served in the plurality of cells. Among the plurality of base stations BS1-BS7, BS1 is the target base station, and the rest of base stations BS2-BS7 are source base stations which are selected through a negative transfer analysis in operation 240

In an example embodiment, the target base station BS1 may serve a plurality of cells $C_1$-$C_7$ having different frequency bands $f_1$-$f_7$ and different cell reselection priorities $\omega_1$-$\omega_7$.

The management server 120 may communicate with the plurality of base stations BS1-BS7 to receive information about the state of the UEs in their serving cells, for example, whether the UEs are in an idle mode or an active mode, the number of active UEs, and an internet protocol (IP) throughout of each cell.

The management server 120 may determine a cell reselection priority for each of the plurality of cells $C_1$-$C_7$ of the target base station BS1 based on a forecasted communication traffic load of the target station BS1 that is predicted via operations 210 and 270. The communication traffic load may be predicted using communication system state information received from the plurality of base stations BS1-BS7. The management server 120 may transmit the cell reselection priorities $\omega_1$-$\omega_7$ to the target base station BS1. The target base station BS1 may forward the cell reselection priorities $\omega_1$-$\omega_7$ to the plurality of UEs so that some of the plurality of UEs are reassigned to another cell to distribute traffic load among the plurality of cells C1-C7.

The forecasting method may be written as computer-executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to electronic device 100, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

The forecasting method may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server or a storage medium of server 106.

The foregoing disclosure provides illustration and description, but is not intended to be exhaustive or to limit the implementation to the precise form disclosed. Modifications and variations are possible in light of the above disclosure or may be acquired from practice of the implementation.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

The embodiments of the disclosure described above may be written as computer executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to electronic device 1000, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

The above described method may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server or a storage medium of the electronic device 1000.

A model related to the neural networks described above may be implemented via a software module. When the model is implemented via a software module (for example, a program module including instructions), the model may be stored in a computer-readable recording medium.

Also, the model may be a part of the electronic device 1000 described above by being integrated in a form of a hardware chip. For example, the model may be manufactured in a form of a dedicated hardware chip for artificial intelligence, or may be manufactured as a part of an existing general-purpose processor (for example, a CPU or application processor) or a graphic-dedicated processor (for example a GPU).

Also, the model may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server of the manufacturer or electronic market, or a storage medium of a relay server.

While the embodiments of the disclosure have been described with reference to the figures, it will be understood by those of ordinary skill in the art that various changes in form and details may be made therein without departing from the spirit and scope as defined by the following claims.

What is claimed is:

1. A method of forecasting a future load by one or more processors, the method comprising:
   obtaining source data sets and a target data set that have been collected from a plurality of source base stations and a target base station, respectively;
   among a plurality of source machine learning models configured to predict a communication traffic load of the plurality of source base stations, selecting at least one source machine learning model that has a traffic load prediction performance higher than that of a target machine learning model configured to predict a communication traffic load of the target base station;
   obtaining weights to be applied to the target machine learning model and the selected at least one source machine learning model via a neural network that determines the weights to the target machine learning model and the selected at least one source machine learning model, respectively for combining the target machine learning model and the selected at least one source machine learning model and that is jointly trained with the target machine learning model and the selected source machine learning models;
   obtaining a load forecasting model for the target base station by combining the target machine learning model and the selected at least one source machine learning model according to the weights; and
   predicting a future communication traffic load of the target base station based on the load forecasting model.

2. The method of claim 1, further comprising:
   transmitting information of the future communication traffic load to the target base station to enable the target base station to assign a plurality of user equipment (UEs) to a plurality of cells of the target base station according to the information of the future communication traffic load.

3. The method of claim 2, wherein the information of the future communication traffic load comprises any one or any combination of a number of active UEs in each of the plurality of cells, a cell load ratio, an internet protocol (IP) throughput per cell, and a cell physical resource block (PRB) usage ratio.

4. The method of claim 1, wherein at least one of the target machine learning model, the plurality of source machine learning model, and the load forecasting model is implemented as a Long Short-Term Memory (LSTM) model that comprises an input layer, a plurality of LSTM layers, a dense layer, and an output layer.

5. The method of claim 1, wherein the neural network is implemented using a multi-layer perceptron (MLP).

6. The method of claim 1, wherein the traffic load prediction performance is measured by calculating a mean average percentage error (MAPE) of each of the target machine learning model and the selected at least one source machine learning model.

7. The method of claim 1, further comprising:
   determining whether a target domain from which the target data set is collected, and source domains from which the source data sets are collected, have a same feature space; and
   prior to obtaining the weights, performing iterative feature matching on the target data set and the source data sets in response to determining that the target domain and the source domains do not have the same feature space.

8. The method of claim 1, further comprising:
   inputting the predicted future communication traffic load and a communication traffic load that is observation from the target base station, to a loss function configured to calculate a mean average percentage error of the load forecasting model;
   determining whether a performance degradation has occurred in the load forecasting model based on the mean average percentage error of the load forecasting model; and
   retraining the load forecasting model in response to determining that the performance degradation has occurred in the load forecasting model.

9. An electronic device comprising:
   at least one memory storing computer-readable instructions; and
   at least one processor configured to execute the computer-readable instructions to:
   obtain source data sets and a target data set that have been collected from a plurality of source base stations and a target base station, respectively;
   among a plurality of source machine learning models configured to predict a communication traffic load of the plurality of source base stations, select at least one source machine learn model that has a traffic load prediction performance higher than that of a target machine learning model configured to predict a communication traffic load of the target base station;
   obtain weights to be applied to the target machine learning model and the selected at least one source machine learning model via a neural network that determines the weights to the target machine learning model and the selected at least one source machine learning model, respectively for combining the target machine learning model and the selected at least one source machine learning model and that is jointly trained with the target machine learning model and the selected source machine learning models;
   obtain a load forecasting model for the target base station by combining the target machine learning model and the selected at least one source machine learning model according to the weights; and
   predict a future communication traffic load of the target base station based on the load forecasting model.

10. The electronic device of claim 9, further comprising a transceiver,
    wherein the at least one processor is further configured to execute the computer-readable instructions to:
    control the transceiver to transmit information of the future communication traffic load to the target base station to enable the target base station to assign a plurality of user equipment (UEs) to a plurality of cells of the target base station according to the information of the future communication traffic load.

11. The electronic device of claim 10, wherein the information of the future communication traffic load comprises any one or any combination of a number of active UEs in each of the plurality of cells, a cell load ratio, an internet protocol (IP) throughput per cell, and a cell physical resource block (PRB) usage ratio.

12. The electronic device of claim 9, wherein at least one of the target machine learning model, the plurality of source machine learning model, and the load forecasting model is implemented as a Long Short-Term Memory (LSTM) model that comprises an input layer, a plurality of LSTM layers, a dense layer, and an output layer.

13. The electronic device of claim 9, wherein the neural network is implemented using a multi-layer perceptron (MLP).

14. The electronic device of claim 9, wherein the at least one processor is further configured to execute the computer-readable instructions to:
measure the traffic load prediction performance by calculating a mean average percentage error (MAPE) of each of the target machine learning model and the selected at least one source machine learning model.

15. The electronic device of claim 9, wherein the at least one processor is further configured to execute the computer-readable instructions to:
determine whether a target domain from which the target data set is collected, and source domains from which the source data sets are collected, have a same feature space; and
prior to obtaining the weights, perform iterative feature matching on the target data set and the source data sets in response to determining that the target domain and the source domains do not have the same feature space.

16. The electronic device of claim 9, wherein the at least one processor is further configured to execute the computer-readable instructions to:
input the predicted future communication traffic load and a communication traffic load that is observation from the target base station, to a loss function configured to calculate a mean average percentage error of the load forecasting model;
determine whether a performance degradation has occurred in the load forecasting model based on the mean average percentage error of the load forecasting model; and
retrain the load forecasting model in response to determining that the performance degradation has occurred in the load forecasting model.

17. A non-transitory computer-readable storage medium having recorded thereon instructions to be executed by at least one processor to perform a method of forecasting a future load, the method comprising:
obtaining source data sets and a target data set that have been collected from a plurality of source base stations and a target base station, respectively;
among a plurality of source machine learning models configured to predict a communication traffic load of the plurality of source base stations, selecting at least one source machine learn model that has a traffic load prediction performance higher than that of a target machine learning model configured to predict a communication traffic load of the target base station;
obtaining weights to be applied to the target machine learning model and the selected at least one source machine learning model via a neural network that determines the weights to the target machine learning model and the selected at least one source machine learning model, respectively for combining the target machine learning model and the selected at least one source machine learning model and that is jointly trained with the target machine learning model and the selected source machine learning models;
obtaining a load forecasting model for the target base station by combining the target machine learning model and the selected at least one source machine learning model according to the weights; and
predicting a future communication traffic load of the target base station based on the load forecasting model.

18. The non-transitory computer-readable storage medium of claim 17, wherein the method further comprises:
transmitting information of the future communication traffic load to the target base station to enable the target base station to assign a plurality of user equipment (UEs) to a plurality of cells of the target base station according to the information of the future communication traffic load,
wherein the information of the future communication traffic load comprises any one or any combination of a number of active UEs in each of the plurality of cells, a cell load ratio, an internet protocol (IP) throughput per cell, and a cell physical resource block (PRB) usage ratio.

19. The non-transitory computer-readable storage medium of claim 17, wherein the method further comprises:
determining whether a target domain from which the target data set is collected, and source domains from which the source data sets are collected, have a same feature space; and
prior to obtaining the weights, performing iterative feature matching on the target data set and the source data sets in response to determining that the target domain and the source domains do not have the same feature space.

20. The non-transitory computer-readable storage medium of claim 17, wherein the method further comprises:
inputting the predicted future communication traffic load and a communication traffic load that is observed from the target base station, to a loss function configured to calculate a mean average percentage error of the load forecasting model;
determining whether a performance degradation has occurred in the load forecasting model based on the mean average percentage error of the load forecasting model; and
retraining the load forecasting model in response to determining that the performance degradation has occurred in the load forecasting model.

* * * * *